(12) United States Patent
Pozzi

(10) Patent No.: US 12,409,084 B1
(45) Date of Patent: Sep. 9, 2025

(54) MULTIMODAL WHEELCHAIR AND METHODS THEREOF

(71) Applicant: Supernal, LLC, Washington, DC (US)

(72) Inventor: Alexander Pozzi, Carlsbad, CA (US)

(73) Assignee: Supernal, LLC, Irvine, CA (US)

( * ) Notice: Subject to any disclaimer, the term of this patent is extended or adjusted under 35 U.S.C. 154(b) by 100 days.

(21) Appl. No.: 18/434,337

(22) Filed: Feb. 6, 2024

Related U.S. Application Data

(60) Provisional application No. 63/483,580, filed on Feb. 7, 2023.

(51) Int. Cl.

| | |
|---|---|
| *A61G 5/10* | (2006.01) |
| *A61G 3/08* | (2006.01) |
| *A61G 5/04* | (2013.01) |
| *A61G 5/12* | (2006.01) |
| *G05D 1/43* | (2024.01) |
| *G05D 3/12* | (2006.01) |
| *G05D 109/10* | (2024.01) |

(52) U.S. Cl.
CPC ......... *A61G 5/1059* (2013.01); *A61G 3/0808* (2013.01); *A61G 5/04* (2013.01); *A61G 5/125* (2016.11); *A61G 5/128* (2016.11); *G05D 1/43* (2024.01); *G05D 3/125* (2013.01); *A61G 5/041* (2013.01); *A61G 2203/14* (2013.01); *A61G 2203/20* (2013.01); *A61G 2203/22* (2013.01); *A61G 2203/30* (2013.01); *G05D 2109/10* (2024.01)

(58) Field of Classification Search
None
See application file for complete search history.

(56) References Cited

U.S. PATENT DOCUMENTS

| | | | | |
|---|---|---|---|---|
| 5,026,225 A | * | 6/1991 | McIntyre | A61G 3/0808 280/808 |
| 5,028,065 A | * | 7/1991 | Danecker | A61G 5/121 152/323 |
| 10,908,045 B2 | * | 2/2021 | Coulter | G05D 1/0274 |
| 2001/0001031 A1 | * | 5/2001 | Craft | A61G 3/0808 410/7 |

(Continued)

FOREIGN PATENT DOCUMENTS

| | | | | |
|---|---|---|---|---|
| CN | 102331780 A | * | 1/2012 | |
| WO | WO-9112975 A1 | * | 9/1991 | A61G 5/045 |

*Primary Examiner* — Daniel L Greene
(74) *Attorney, Agent, or Firm* — Bookoff McAndrews, PLLC

(57) ABSTRACT

A multimodal wheelchair configured to be securely mounted to an aircraft is disclosed. The multimodal wheelchair may include: a first section, including: a processing system contained within a housing of the first section; a movement controller component positioned on a portion of the first section that is connected to the processing system; a plurality of wheels that are controllable by the movement controller; and a set of tracks recessed within a first side of the first section; and a second section, including: a seat portion located on a first side of the second section, the seat portion having an integrated harness; and a connection component, coupled to a second side of the second section, that attaches the second section to the first section via coupling with the set of tracks of the first section. Other aspects are described and claimed.

20 Claims, 19 Drawing Sheets

(56) References Cited

U.S. PATENT DOCUMENTS

| | | | |
|---|---|---|---|
| 2004/0251656 A1* | 12/2004 | Patterson | A61G 7/1053 |
| | | | 280/304.1 |
| 2016/0184150 A1* | 6/2016 | Kennedy | A61G 5/125 |
| | | | 180/6.7 |
| 2019/0282431 A1* | 9/2019 | Moore | A61G 5/04 |
| 2024/0016673 A1* | 1/2024 | Pozzi | A61G 3/0808 |

* cited by examiner

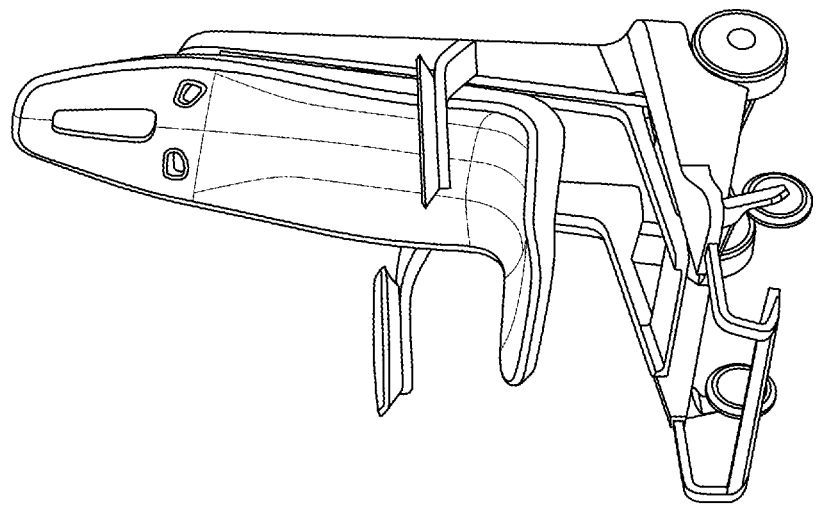
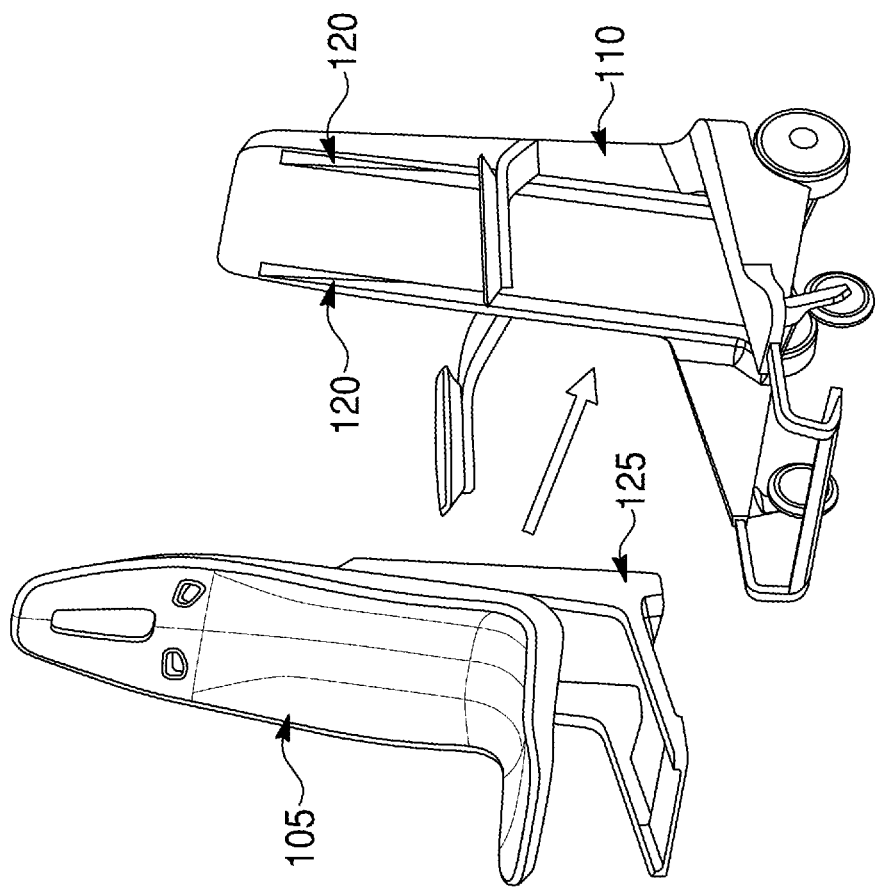
FIG. 2B
FIG. 2A

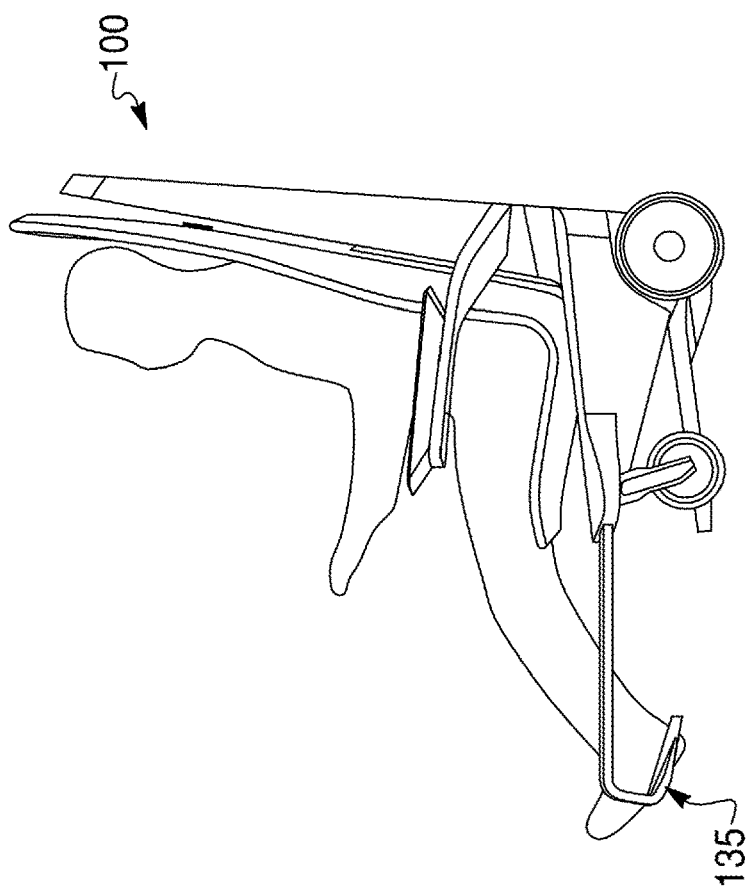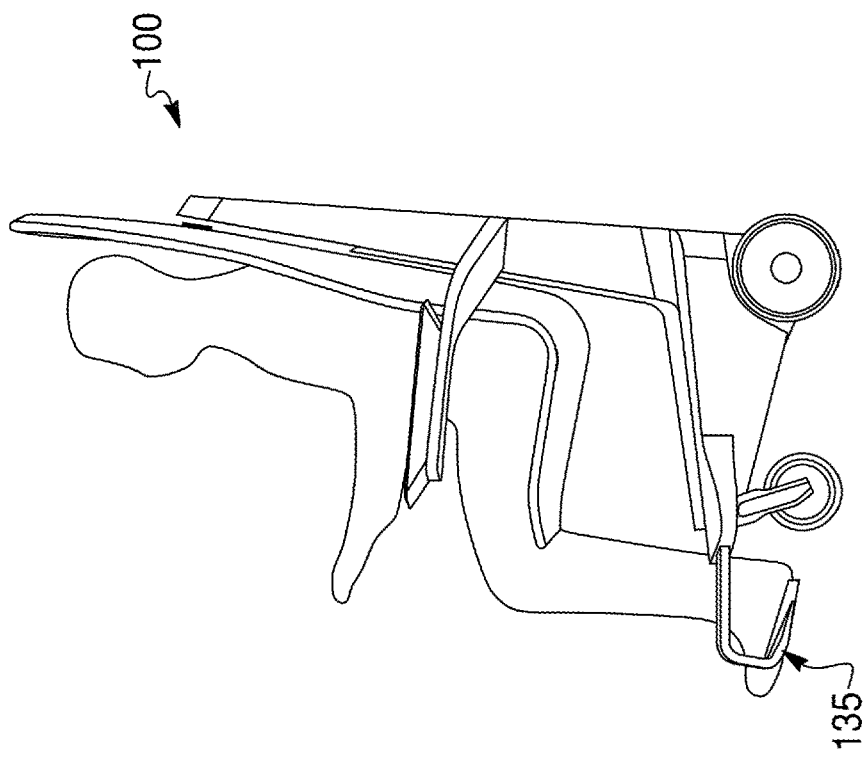

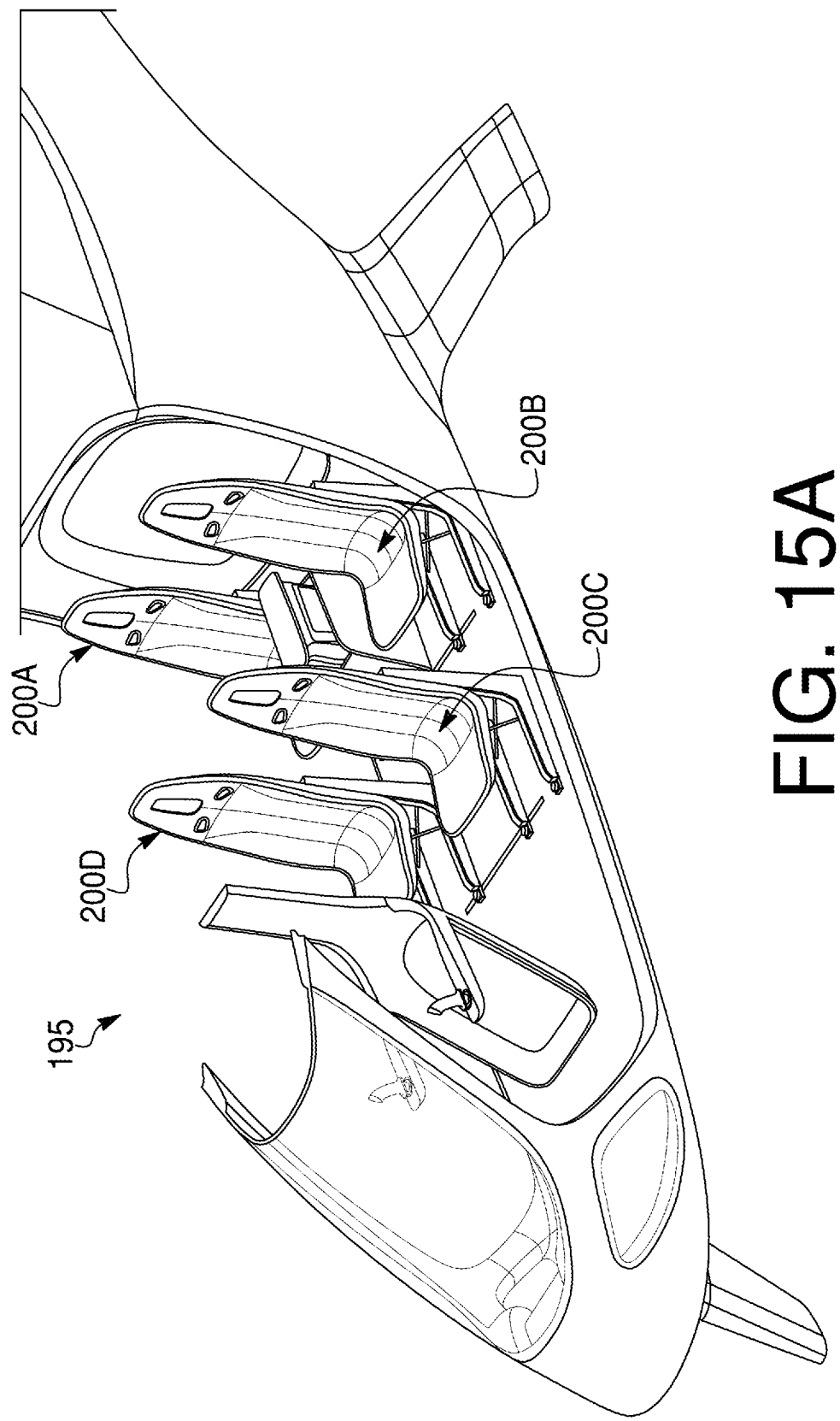

MULTIMODAL WHEELCHAIR AND METHODS THEREOF

CROSS REFERENCE TO RELATED APPLICATIONS

This application claims priority to U.S. Provisional Application No. 63/483,580 filed Feb. 7, 2023, which is incorporated by reference herein in its entirety.

TECHNICAL FIELD

Aspects of the present disclosure relate generally to embodiments of a multimodal wheelchair, and, more specifically, to embodiments of the multimodal wheelchair that facilitate improved operation thereof and that enable secure attachment of the multimodal wheelchair to a vehicle.

BACKGROUND

Differently-abled individuals may encounter challenges when navigating public transportation, including airplanes, trains, buses, etc. While regulatory standards mandate transportation authorities to provide various accommodations to differently-abled individuals, these provisions often fall short in ensuring a dignified travel experience. For instance, individuals relying on wheelchairs may be subject to certain accommodations that may be overly burdensome and/or demeaning. Accordingly, the existing framework, though aimed at inclusivity, highlights the need for more effective and considerate solutions to enhance the travel experience for those with varying functional needs.

The present disclosure is accordingly directed to a multimodal wheelchair that is configured to be attachable to a vehicle and that users may sit in during vehicle operation. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, a multimodal wheelchair mountable to a vehicle is disclosed.

In one aspect, a multimodal wheelchair is disclosed. The multimodal wheelchair may include: a first section, including: a processing system contained within a housing of the first section; a movement controller component positioned on a portion of the first section that is connected to the processing system; a plurality of wheels that are controllable by the movement controller; and a set of tracks recessed within a first side of the first section; and a second section, including: a seat portion located on a first side of the second section, the seat portion having an integrated harness; and a connection component, coupled to a second side of the second section, that attaches the second section to the first section via coupling with the set of tracks of the first section.

In another aspect, a power chair base of an electric wheelchair is disclosed. The power chair base may include: a first section including a pair of recessed tracks configured to secure a seat section of the electronic wheelchair; a second section, connected to a distal end of the first section, including a plurality of wheels; a processor contained within a housing of the power chair base; and a movement controller positioned on a surface of the first section.

In yet another aspect, a method of autonomously docking an electronic wheelchair to a vehicle is disclosed. The method may include: receiving, at a system of the electronic wheelchair, sensor data; identifying, from the sensor data and using a processor associated with the system, an indication of a predetermined docking location within the vehicle; aligning, via instructions provided by the processor to a controller of the electronic wheelchair, the electronic wheelchair with the predetermined docking location; and deploying, subsequent to the aligning, a securement mechanism of the electronic wheelchair to attach with a locking mechanism present at the predetermined docking location.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE DRAWINGS

The accompanying drawings, which are incorporated in and constitute a part of this specification, illustrate the disclosed embodiments, and together with the description, serve to explain the principles of the disclosed embodiments. There are many aspects and embodiments described herein. Those of ordinary skill in the art will readily recognize that the features of a particular aspect or embodiment may be used in conjunction with the features of any or all of the other aspects or embodiments described in this disclosure. In the drawings:

FIGS. 2A-2B depict connection of a seat portion to a base portion of the multimodal wheelchair, according to various aspects of the present disclosure.

FIGS. 6A-6B depict varying seating configurations of a user seated in the multimodal wheelchair, according to various aspects of the present disclosure.

FIGS. 15A-15D depict a process for mounting the multimodal wheelchair to a vehicle, according to various aspects of the present disclosure.

DETAILED DESCRIPTION OF THE EMBODIMENTS

Figure 1:
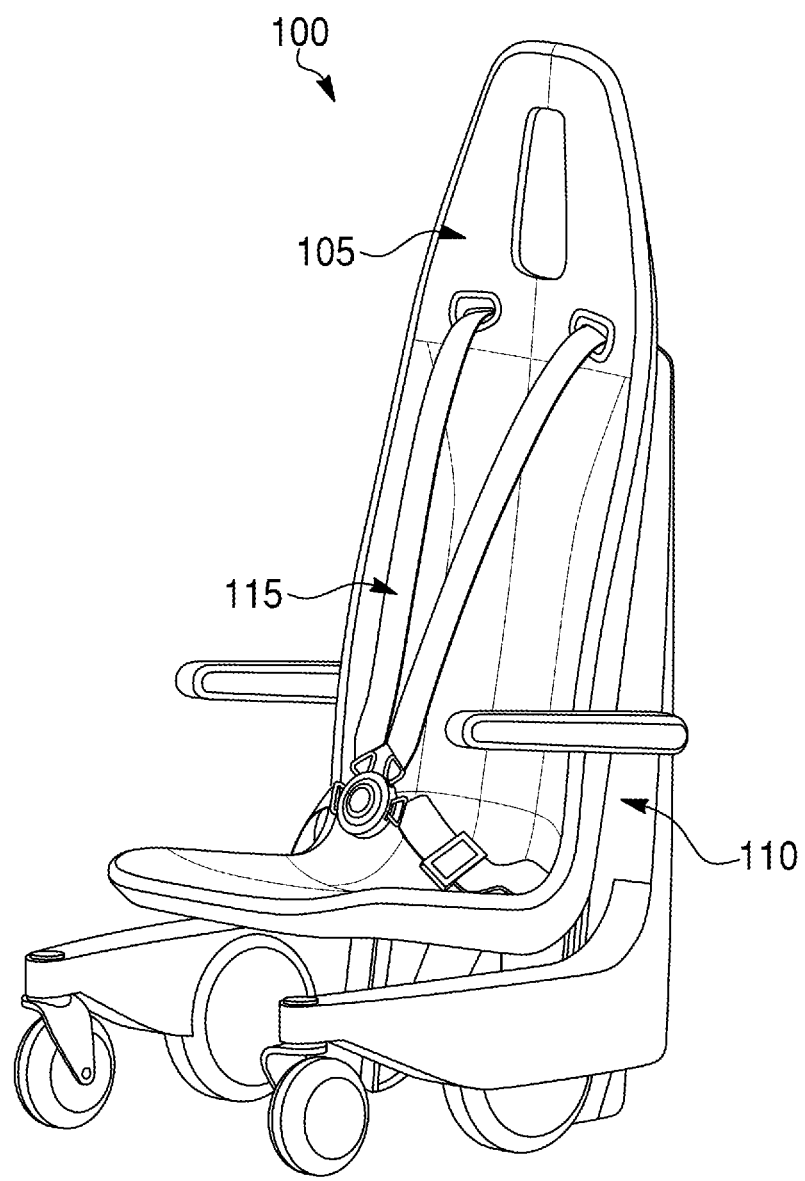
FIG. 1 depicts a perspective view of a multimodal wheelchair, according to various aspects of the present disclosure.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

In this this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as "about," "approximately," "substantially," and "generally," are used to indicate a possible variation of ±10% of a stated or understood value. In addition, the term "between" used in describing ranges of values is intended to include the minimum and maximum values described herein. The use of the term "or" in the claims and specification is used to mean "and/or" unless explicitly indicated to refer to alternatives only or the alternatives are mutually exclusive, although the disclosure supports a definition that refers to only alternatives and "and/or." As used herein "another" may mean at least a second or more.

As used herein, the term "user" generally encompasses any person that is operating and/or sitting in a mobility aid such as a multimodal wheelchair, as described herein. As used herein, the term "vehicle" may refer to any type of vehicle, e.g., motor vehicles (e.g., cars, trucks, buses, etc.), railed vehicles (e.g., trains, etc.), amphibious vehicles (e.g., boats, etc.), aircraft (e.g., planes, helicopters, etc.), spacecraft, autonomous or semi-autonomous vehicles, and the like. Various embodiments of the present disclosure relate generally to electric vehicles, such as vehicles driven via one or more electric loads, components associated with the electrical loads, and monitoring systems for the electrical loads and/or the components associated with the electrical loads. The electric loads may be in the form of electric motors associated with one or more propellers of a vertical takeoff and landing vehicle.

Efforts have been made to improve the accommodations provided to differently-abled individuals that utilize public transit. However, many conventional attempts to address the challenges that they may face often result in less-than-ideal outcomes. For instance, the current practice of storing wheelchairs during flights and having individuals manually lifted into designated seats may be burdensome and demeaning. Specifically, the foregoing practice may lead to discomfort during the boarding process and may not always be sensitive to an individuals' needs. The lack of a seamless and dignified solution may be particularly pronounced in smaller aircraft, such as an electric VTOL, which may lack the necessary space to accommodate certain types of wheelchairs (e.g., battery-powered wheelchairs, etc.), thereby potentially restricting travel options that these differently-abled individuals may use. Accordingly, a need exists for an improved wheelchair that may provide the user with expanded functionality during operation and that also may be capable of securely attaching to a vehicle, such as an aircraft.

In view of the issues described above, aspects of this disclosure aim to address the limitations and discomforts associated with conventional solutions by providing an improved wheelchair, or "multimodal" wheelchair, that ensures that differently-abled individuals may experience dignified and functional travel. The multimodal wheelchair may enable users to travels in all forms of transport without exiting their wheelchair. Additionally, characteristics of the wheelchair may be easily adjusted by the user (e.g., chair speed, chair height, chair orientation, etc.) to further meet their travel needs. Furthermore, the multimodal wheelchair may be configured to manually or autonomously dock within certain vehicle cabins to ensure that users are safely secured during travel. In yet a further aspect, the multimodal wheelchair may be configured to allow full crash attenuation to occur.

Reference will now be made in detail to the exemplary embodiments of the present disclosure described below and illustrated in the accompanying drawings. Wherever possible, the same reference numbers will be used throughout the drawings to refer to same or like parts.

Additional objects and advantages of the embodiments will be set forth in part in the description that follows, and in part will be obvious from the description, or may be learned by practice of the embodiments. It is to be understood that both the foregoing general description and the following detailed description are exemplary and explanatory only and are not restrictive of the claims.

Referring now to FIG. 1, an exemplary multimodal wheelchair is illustrated. In an embodiment, multimodal wheelchair 100 may be an electric wheelchair that comprises a first section, e.g., seat portion 105, and a second section, e.g., base portion 110, which are collectively designed to enhance user comfort, functionality, mobility, and overall safety. Seat portion 105 may have a first side, e.g., "front side," that provides a comfortable and secure seating arrangement for the user. In embodiment, the first side of seat portion 105 may contain integrated harness 115 that may be utilized to effectively secure a user to the seat and ensure stability and safety during vehicle operation. Integrated harness 115 is depicted in FIG. 1 as containing four strap portions that may converge and be connected to a buckle. In other configurations (not illustrated here) integrated harness 115 may contain fewer or greater strap portions and/or may contain two or more buckles. In an embodiment, seat portion 105 may contain a second side, e.g., "back side," that is integrated with connection component 125, the details of which are further described herein.

In an embodiment, base portion 110 may be battery-powered and may contain an integrated processing system, e.g., situated within housing of base portion 110. The integrated processing system may interact with one or more controllers and sensors of an integrated sensor system to control functional aspects of multimodal wheelchair 100. For instance, integrated processing system may enable a user to control: a movement direction of multimodal wheelchair 100, a movement speed of multimodal wheelchair 100, a height setting of seat portion 105, other features of multimodal wheelchair 100, and the like. In an embodiment, each multimodal wheelchair 100 may be fully customizable to the user's preferences. In this regard, virtually any dimension, feature, and/or aesthetic or technical characteristic of the multimodal wheelchair may be chosen by a user.

In an embodiment, base portion 110 may contain two general sections. The first section may be a columnar section that extends vertically from a second, wheel-supporting section. In an embodiment, the first section may contain a set of tracks 120 that are recessed into one side. The first section may further contain one or more armrests and/or a movement controller. In an embodiment, second section may secure a set of wheels and/or a footrest and may also house one or more deployment mechanisms. Additional details regarding the foregoing features of base portion 110 are further described herein.

Referring now collectively to FIGS. 2A-2B, an attachment process of seat portion 105 to base portion 110 is illustrated. In an embodiment, connection component 125 may be configured to fit into set of tracks 120 of base portion 110. For instance, FIG. 2A illustrates base portion 110 having two tracks 120 that corresponding vertical elements of connection component 125 may fit and lock into. Once attached, as shown in FIG. 2B, a user may interact with various controls to adjust characteristics of seat portion 105 and/or movement of base portion 110. More particularly, referring now to FIG. 3, a user may interact with movement controller 130 that comprises joystick 130A (for providing directional control and/or seat height control), rotatable speed adjustment knob 130B (for providing speed control), and digital display 130C (for providing direction indications, speed indications, battery indications, alert notifications, etc.). Movement controller 130 may be mounted to a portion of base portion 110 (e.g., on or near the arm rests, etc.).

Figure 3:
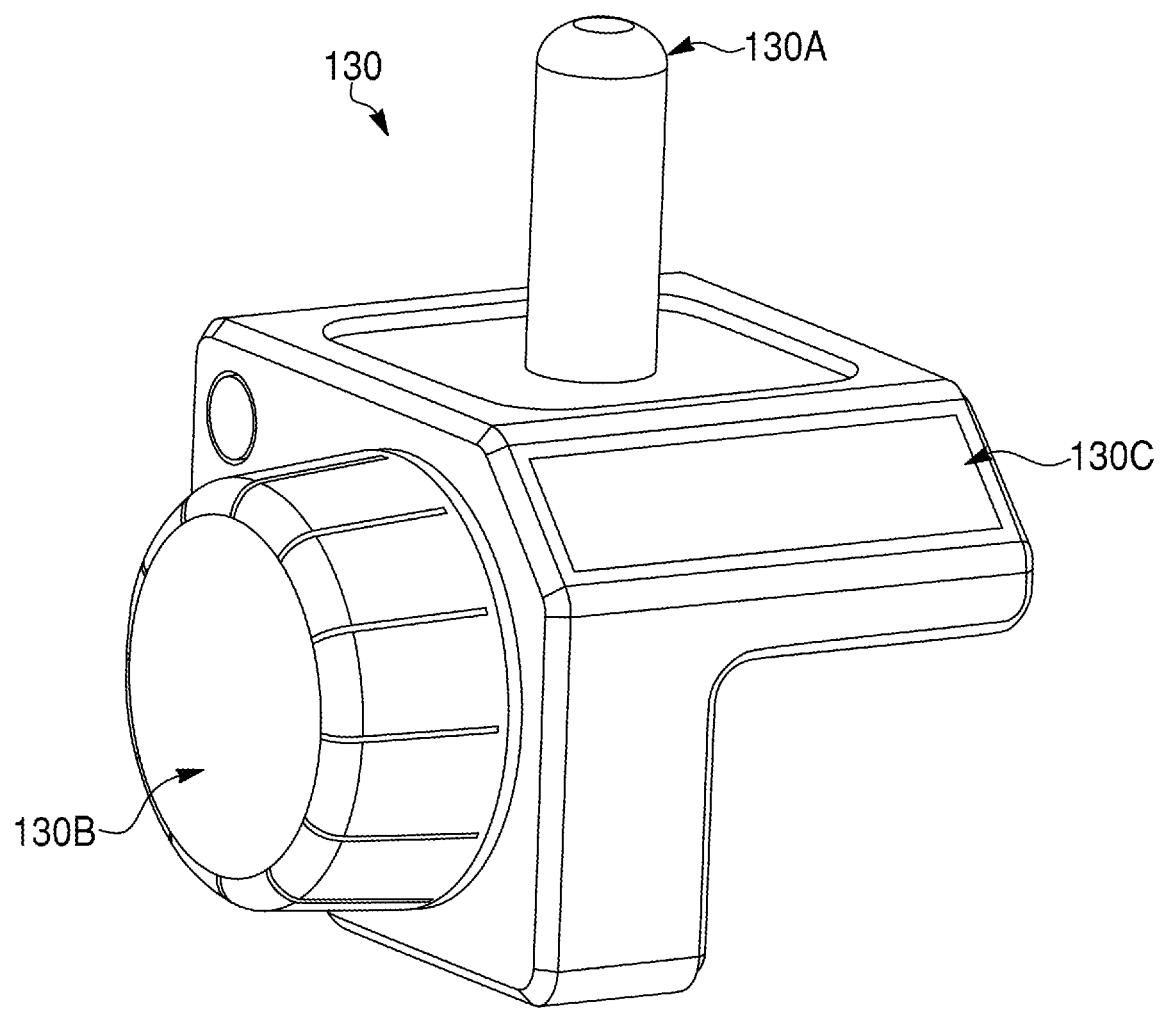
FIG. 3 depicts a movement controller of the multimodal wheelchair, according to various aspects of the present disclosure.

It is important to note that the illustrated movement controller 130 in FIG. 3 is only exemplary and is not intended to be limiting. More particularly, the user may interact with another controlling device (e.g., a remote controller, a keypad control, etc.), in lieu of or in addition to movement controller 130, to control movement and other aspects of the multimodal wheelchair.

Figure 4:
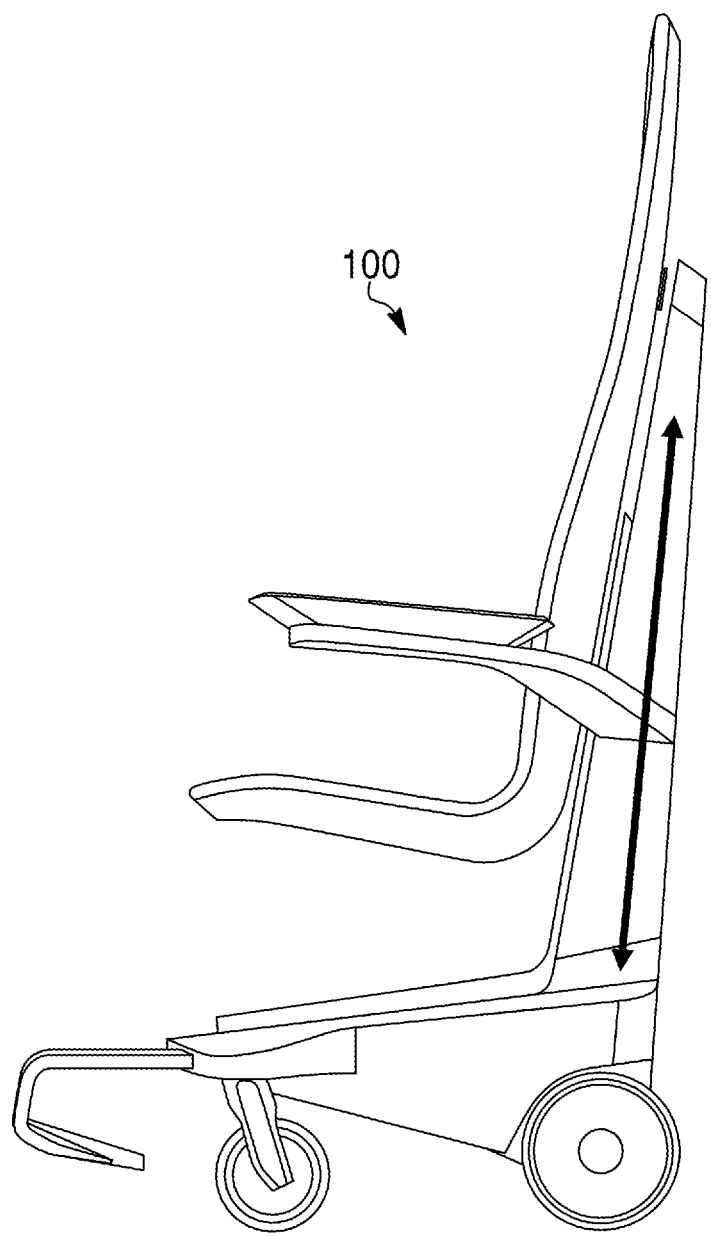
FIG. 4 depicts a side view of a multimodal wheelchair, according to various aspects of the present disclosure.
Figure 5C:
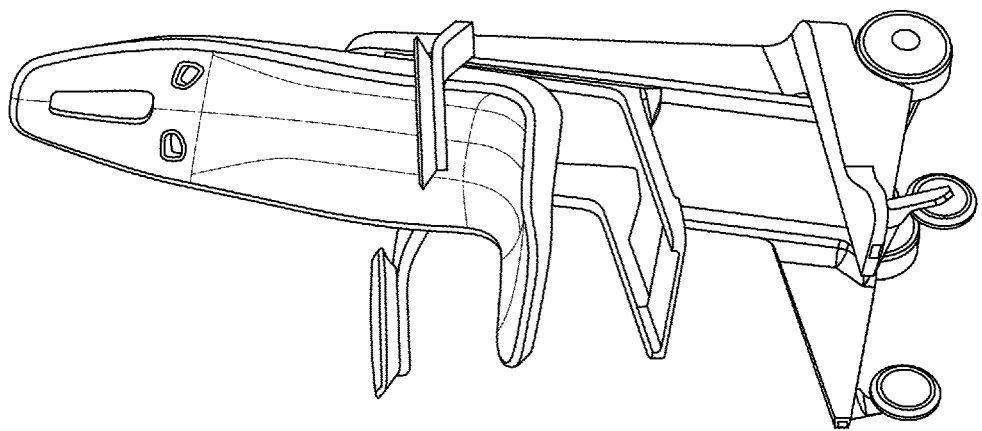
FIGS. 5A-5C depict varying height configurations of a seat portion within the multimodal wheelchair, according to various aspects of the present disclosure.
Figure 5B:
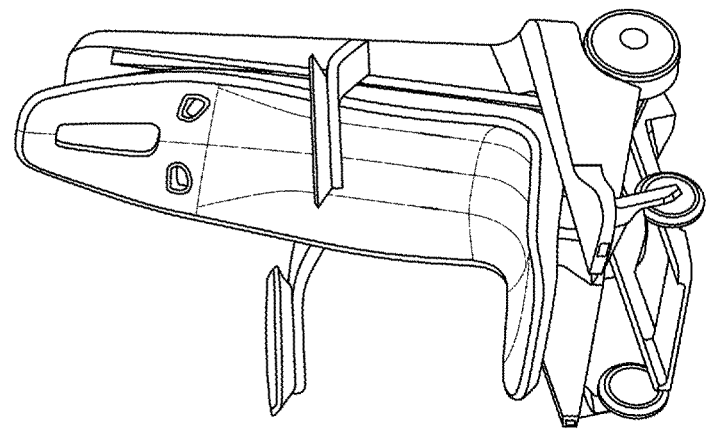
Figure 5A:
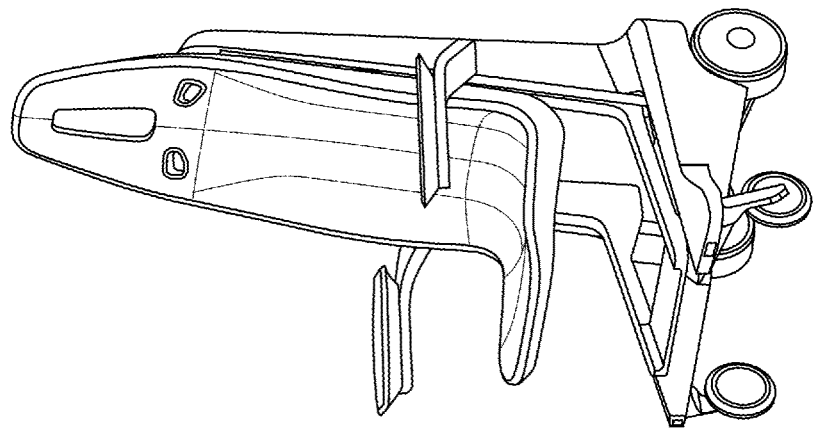

In an embodiment, a user may leverage movement controller 130, or another control feature of the multimodal wheelchair, to implement height adjustments to their seat. For instance, with respect to FIG. 4, a user may provide inputs (e.g., via interaction with movement controller 130) to a linear actuator (e.g., housed within base portion 110) to facilitate vertical height adjustments that may move the seat up or down depending on their needs. For example, referring now to FIG. 5A, multimodal wheelchair 100 is presented in a "ride height" configuration, which may be the height of seat portion 105 during normal use (e.g., approximately 8" lift, approximate 20" seat pan). FIG. 5B illustrates a "lock height" configuration, which may be the height of seat portion 105 when multimodal wheelchair 100 is locked inside a cabin during vehicle operation (e.g., approximately 0" lift, approximate 12.25" seat pan). FIG. 5C illustrates a "standing height" configuration, which may be the height of seat portion 105 in a situation where a user desires to speak to another individual at eye-level.

In some embodiments, the user may manipulate height of seat portion 105 manually, e.g., via interaction with aspects of movement controller 130 (or another equivalent device). In other embodiments, height of seat portion 105 may be dynamically adjusted, e.g., without receiving any explicit user input. For instance, one or more sensors (e.g., global positioning system (GPS) GPS sensors, location sensors, etc.) may be positioned in seat portion 105, base portion 110, both, etc., that may be configured to gather positional/location information associated with multimodal wheelchair 100. This information may be transmitted to an onboard processor, e.g., positioned in base portion 110, that may subsequently be configured to control height of seat portion 105 (e.g., by transmitting instructions to a linear actuator) based on the identified location that multimodal wheelchair 100 is determined to be in. For instance, responsive to identifying that multimodal wheelchair 100 has transitioned from a public location (e.g., an airport, etc.) into a vehicle cabin (e.g., airplane cabin), multimodal wheelchair 100 may be configured to dynamically transition from a "ride height" configuration to a "lock height" configuration.

In an embodiment, the adjustments in height of seat portion 105 may cause other aspects of multimodal wheelchair 100 to correspondingly and automatically adjust. For example, referring now to FIGS. 6A-6B, adjustable footrest 135 integrated in second section of base portion 110 is illustrated that may move in concert with the linear actuator (e.g., may expand or retract as the seat height is adjusted). For instance, FIG. 6A illustrates multimodal wheelchair 100 having a seat height adjusted to a normal configuration. During transition of multimodal wheelchair 100 from the normal configuration to a locked configuration (i.e., in which the seat height is lowered), adjustable footrest 135 may correspondingly extend outward to accommodate the user's resulting leg length (e.g., via manual movement by the user, dynamically via a mechanical or electronic connection with the linear actuator, etc.). In an embodiment, adjustable footrest 135 may be adjustable to any position up to an absolute adjustment length or, alternatively, adjustable footrest 135 may have preconfigured adjustment settings, each of which correspond to a specific adjustment length.

Figure 7B:
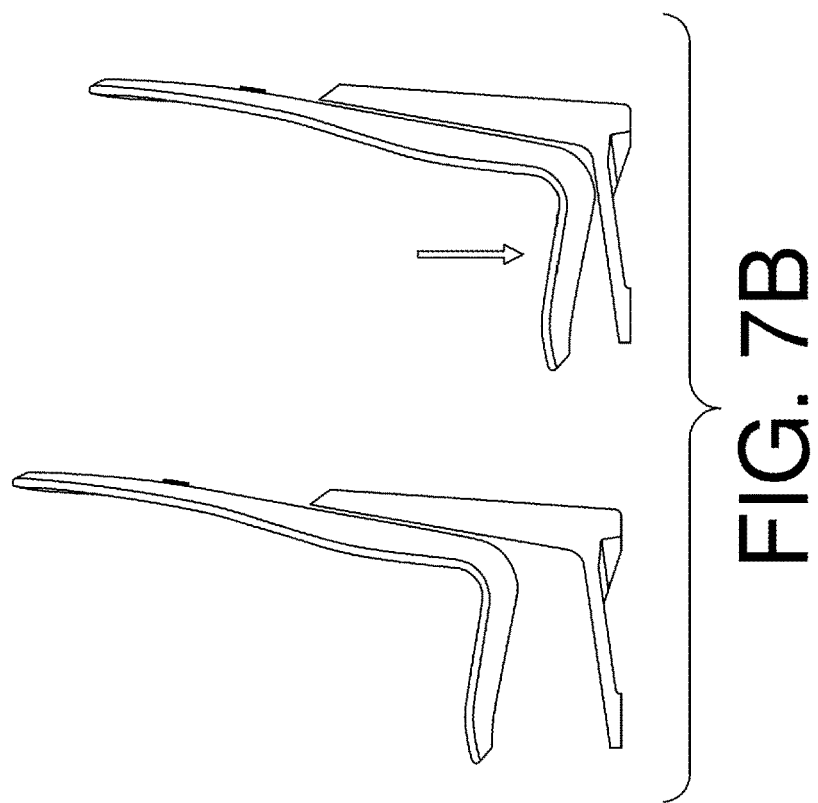
FIGS. 7A-7B depict varying views and configurations of the multimodal wheelchair in a crash event, according to various aspects of the present disclosure.
Figure 7A:
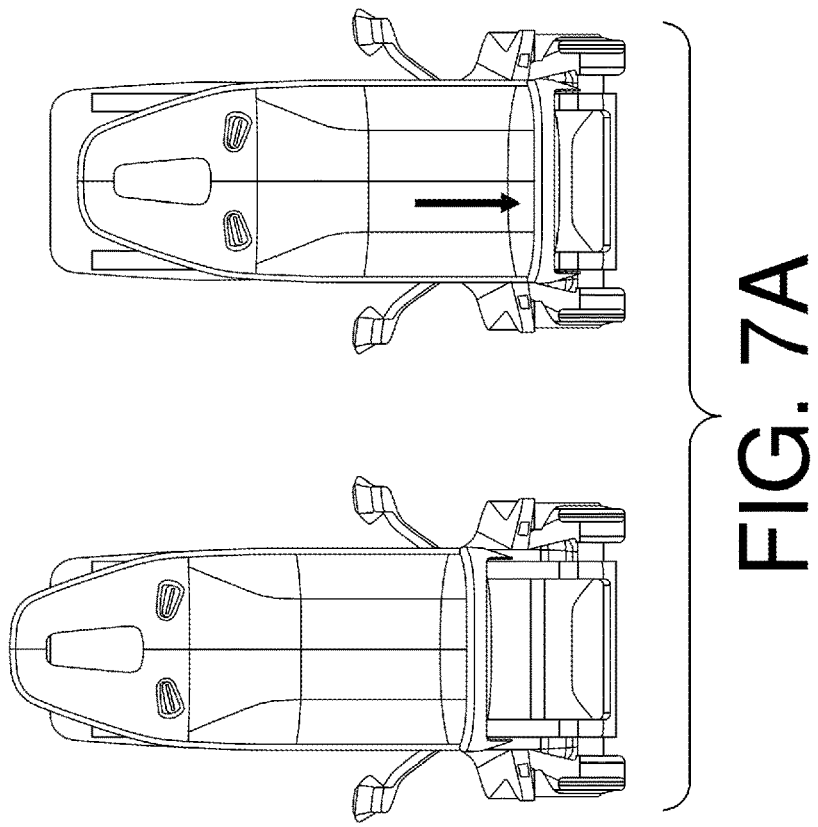

In an embodiment, base portion 110 of multimodal wheelchair 100 may be designed to allow full stroke for crash attenuation. For instance, FIG. 7A depicts the movement range of seat portion 105 in multimodal wheelchair 100 during a crash event. Specifically, the linear actuator may be configured to release seat portion 105 from its present height configuration with respect to connection component 125 to a lowered configuration (e.g., in which seat portion 105 contacts protrusions 125a of connection component 125) in response to detection of a crash event, thereby decreasing the forces that may act on a user's body during a crash event. FIG. 7B depicts a side view of the movement range of seat portion 105 occurring in FIG. 7A.

Figure 8:
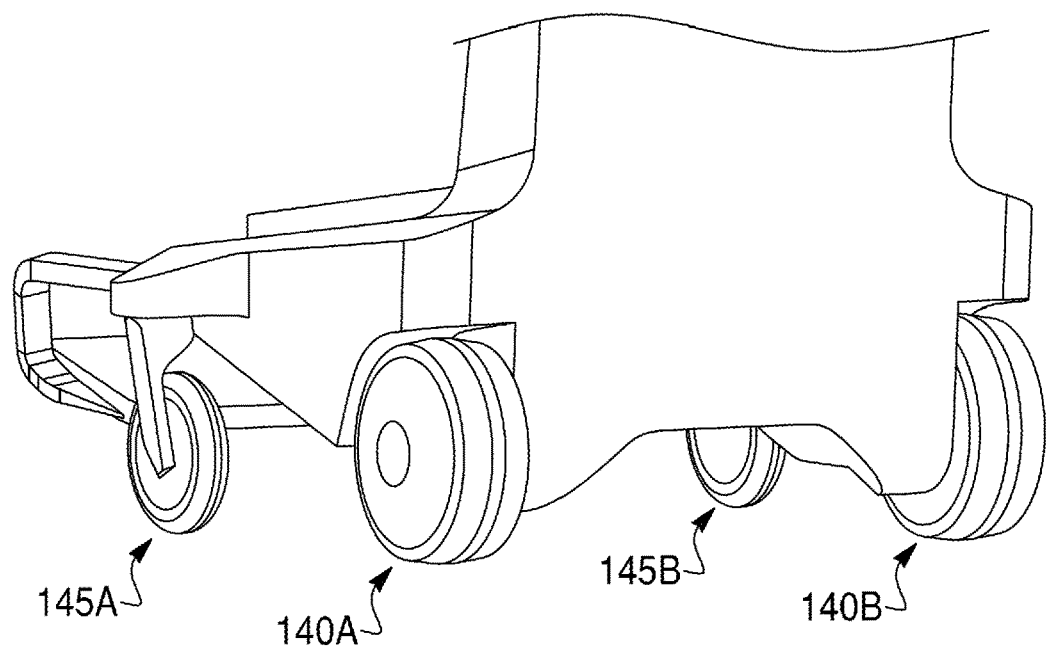
FIG. 8 depicts wheels of the multimodal wheelchair, according to various aspects of the present disclosure.

Referring now to FIG. 8, base portion 110 of the multimodal wheelchair 100 may contain a plurality of wheels. More particularly, base portion 110 may contain four wheels via which multimodal wheelchair 100 may move around on. Each of the four wheels may be composed of a non-marking rubber material. In an embodiment, the two rear wheels 140A, B may be 8" independent power wheels with electric HUB motors whereas the two front wheels 145A, B may be 5" caster wheels. It is important to note that these wheel dimensions are not limiting and other wheelchair configurations having different sized wheels may also be possible. For instance, in an embodiment, multimodal wheelchair 100 may contain fewer or greater than four wheels. In another embodiment, each of the wheels of multimodal wheelchair 100 may be substantially the same size and/or each of the wheels may be independent power wheels having independent electric HUB motors.

Figure 9:
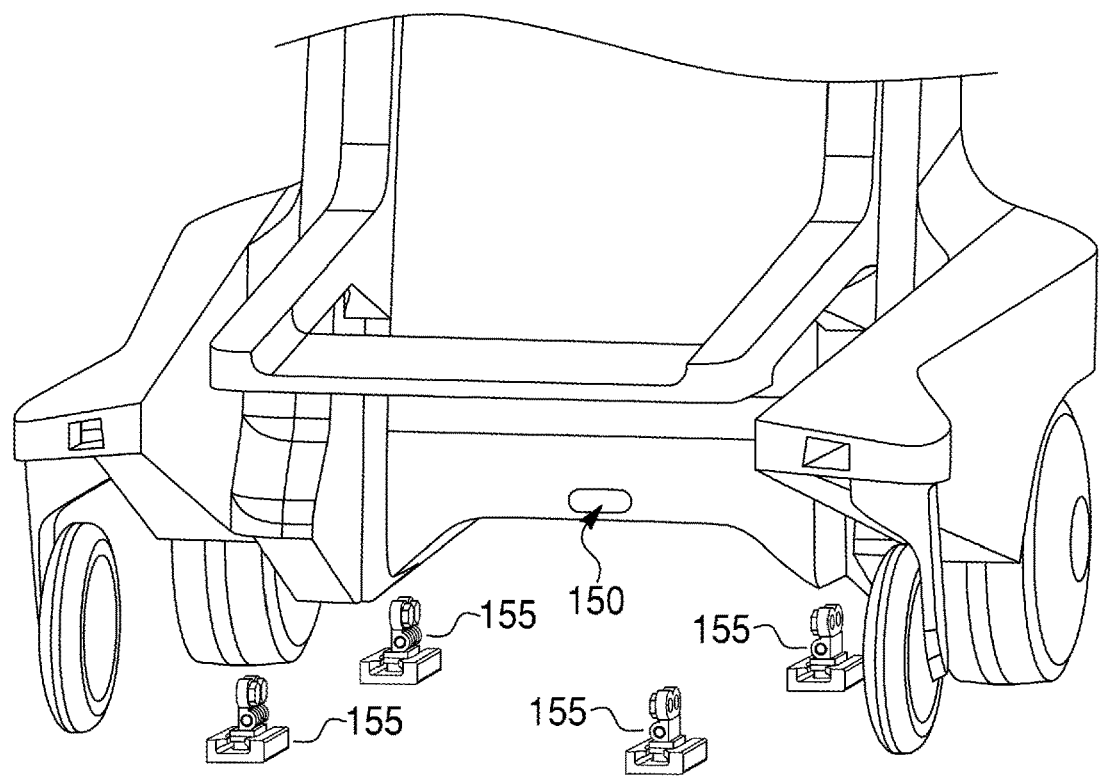
FIG. 9 depicts an onboard vision system of the multimodal wheelchair, according to various aspects of the present disclosure.

Referring now to FIG. 9, multimodal wheelchair 100 may contain an integrated sensor system, also described herein as an "onboard vision system," that may contain one or more sensors (e.g., light/camera sensors, proximity sensors, infrared sensors, etc.) that are capable of detecting objects positioned around multimodal wheelchair 100. For instance, FIG. 9 illustrates a sensor 150 associated with the onboard vision system that is capable of identifying objects, and/or the characteristics thereof, within a viewing/detection range of sensor. In an embodiment, data obtained by sensor 150 may be leveraged by the processing system to facilitate autonomous docking with a vehicle, e.g., an aircraft. More particularly, the onboard vision system may leverage one or more sensors to identify a predetermined location within the cabin where multimodal wheelchair 100 must be situated. For instance, the vehicle cabin may contain four locking mechanisms 155 that are positioned at a predetermined location on the cabin floor. The sensor(s) of onboard vision system may detect the positions of these locking mechanisms 155 (e.g., via image analysis and object recognition, etc.) and transmit indications of their identified positions to a system processor. The system processor may thereafter dynamically steer multimodal wheelchair 100 (e.g., by providing instructions to one or more controllers) so that it is properly aligned with locking mechanisms 155. In some aspects, locking mechanisms 155 may be stored within the vehicle floor and may deploy, e.g., either by manual actuation or by dynamic deployment (e.g., upon receiving an indication from a processor/controller that a multimodal wheelchair 100 is proximate to a position of the locking mechanisms), to accommodate multimodal wheelchair 100.

Figure 10A:
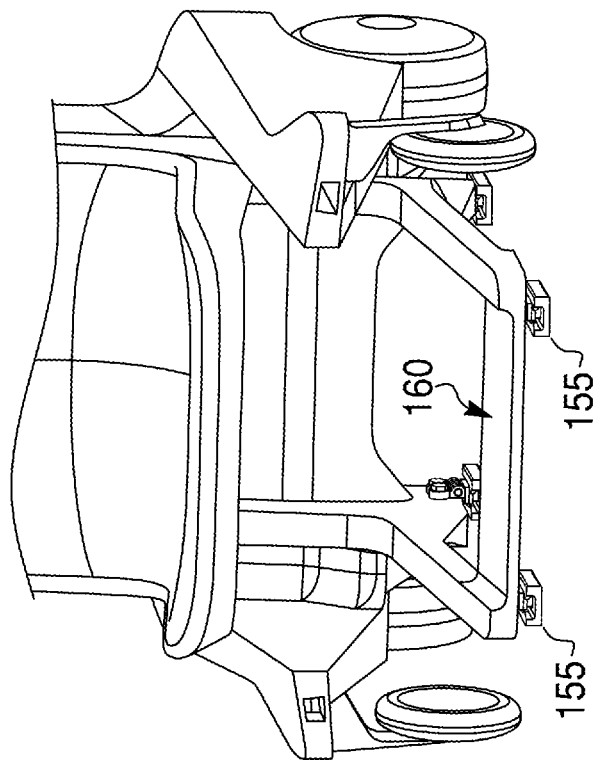
FIGS. 10A-10B depict operation of a securement mechanism of the multimodal wheelchair, according to various aspects of the present disclosure.
Figure 10B:
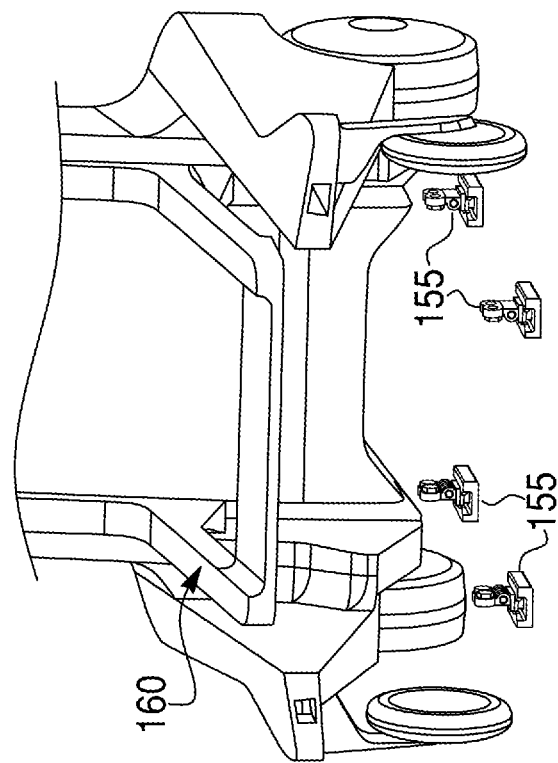

Referring now to FIGS. 10A and 10B, once multimodal wheelchair 100 is properly positioned with respect to locking mechanisms 155, the system processor may provide instructions (e.g., to one or more relevant controllers contained in base portion 110, etc.) to deploy securement mechanism 160, which may effectively secure multimodal wheelchair 100 in place. More particularly, FIG. 10B illustrates that securement mechanism 160 may be lowered down to initiate coupling with locking mechanisms 155. Upon proper attachment, multimodal wheelchair 100 may be securely held in place during the duration of vehicle operation.

It is important to note that the number, position, and/or type of locking mechanisms are not limited to what is presented in FIGS. 10A and 10B. For example, multimodal wheelchair 100 may be configured to attach to fewer or greater locking mechanisms. Similarly, it is also important to note that the number, shape, and/or dimensions of securement mechanism 160 is not limited to the implementation illustrated in FIGS. 10A and 10B.

In an embodiment, the wheelchair user and/or one or more other individuals may be apprised when a successful docking has occurring. For instance, a notification indicating that multimodal wheelchair 100 successfully docked with locking mechanisms 155 may be transmitted to digital display 130C of movement controller 130, to a user's personal device (e.g., a user's mobile device, etc.), a pilot's personal device, any combination of the foregoing, and the like. Similarly, a notification may be transmitted to any of the foregoing devices responsive to detecting that multimodal wheelchair 100 becomes unsecured during flight. In an embodiment, certain vehicle functions may be limited unless an indication of successful docking of the multimodal wheelchair is received. For instance, a pilot may not be able to activate various aircraft systems that facilitate flight unless the aircraft systems are apprised that the multimodal wheelchair is secured to the aircraft.

FIGS. 11-14B illustrate different types of securement mechanisms and techniques for securing multimodal wheelchair 100 within a vehicle during travel.

Figure 11B:
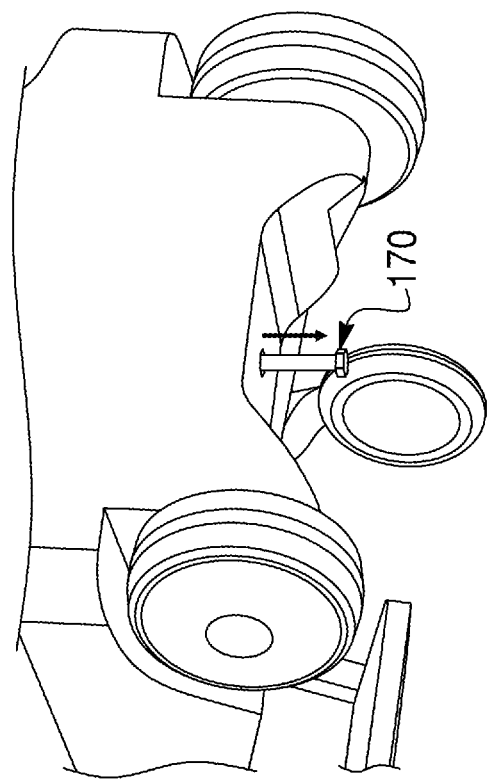
FIGS. 11A-11B depict operation of another securement mechanism of the multimodal wheelchair, according to various aspects of the present disclosure.
Figure 11A:
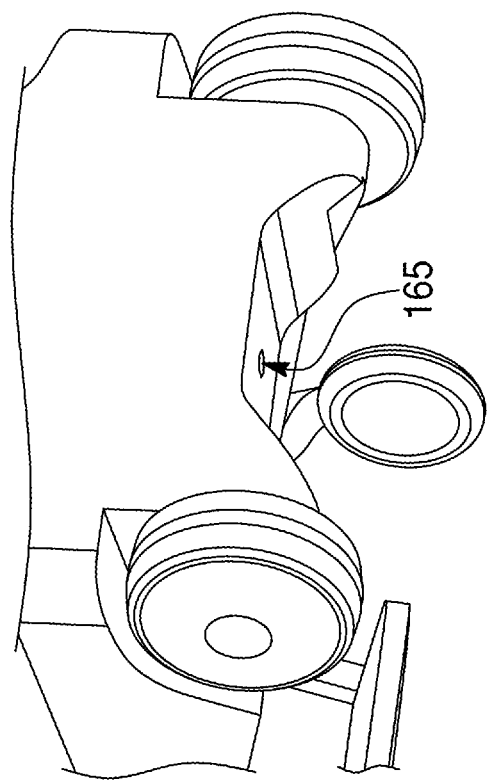
Figure 12:
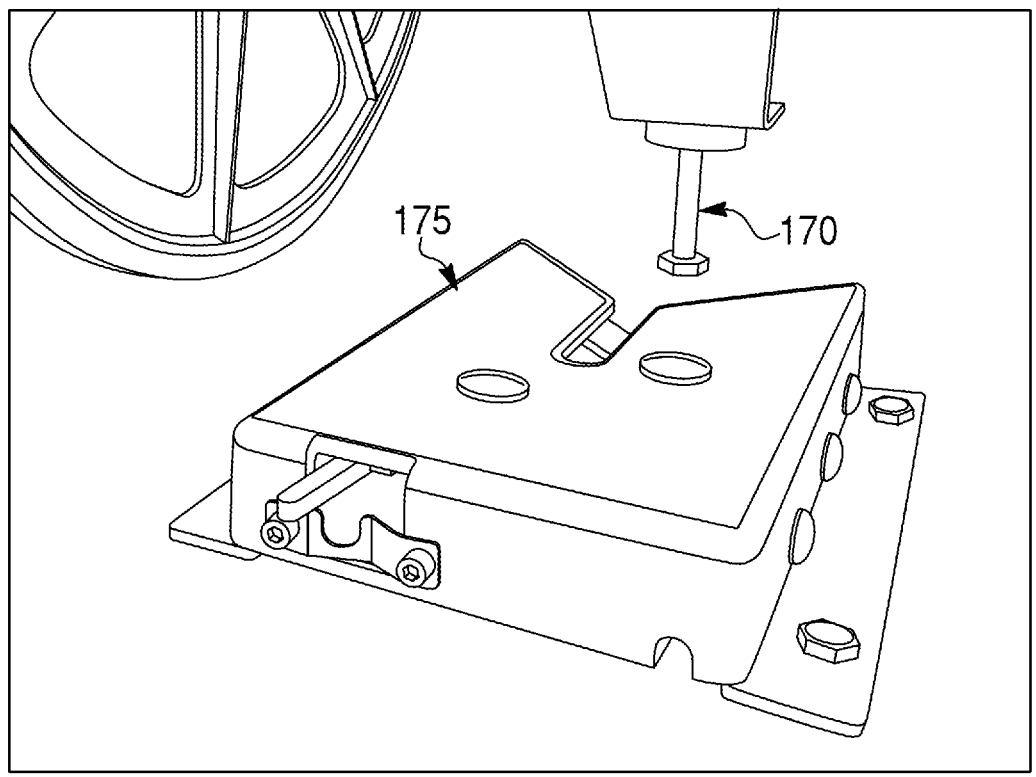
FIG. 12 depicts a wheelchair securement device, according to various aspects of the present disclosure.

Referring now to FIGS. 11A and 11B, a deployable securement mechanism for attaching the multimodal wheelchair to a vehicle (e.g., car, train, bus, boat, etc.) is provided. In FIG. 11A, multimodal wheelchair 100 is illustrated as having deployment port 165 (e.g., on the underside of base portion 110). Securement mechanism 170 may be stowed within the housing of base portion 110 when not in use and may deploy through deployment port 165 when released, as illustrated in FIG. 11B. In an embodiment, securement mechanism 170 may be deployed manually (e.g., by the user interacting with movement controller 130 or another device) or, alternatively, may be deployed dynamically (e.g., automatically upon the sensor system automatically identifying that multimodal wheelchair 100 is within a predetermined distance of a detected locking mechanism). In an embodiment, the securement mechanism illustrated here may be a bolt (e.g., a Q'STRAINT bolt, etc.) that may interact with a corresponding locking mechanism that is integrated into the vehicle floor, such as locking mechanism 175 illustrated in FIG. 12. It is important to note that the securement mechanism illustrated in FIGS. 11B and 12 is not limiting and another securement mechanism having a different shape, size, position, and/or be of a different type may be utilized.

Figure 13:
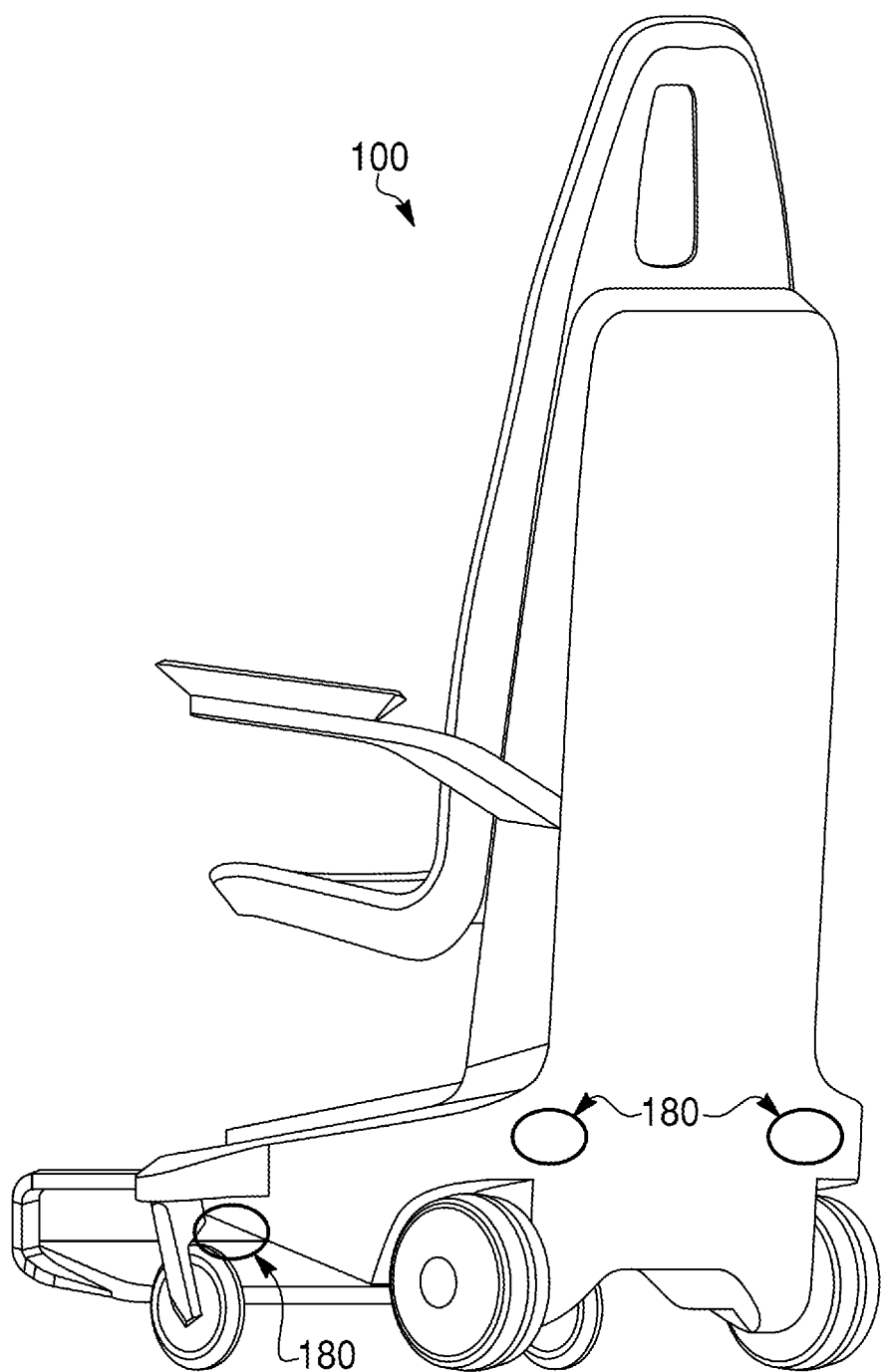
FIG. 13 depict securement mechanism attachment locations on a multimodal wheelchair, according to various aspects of the present disclosure.
Figure 14B:
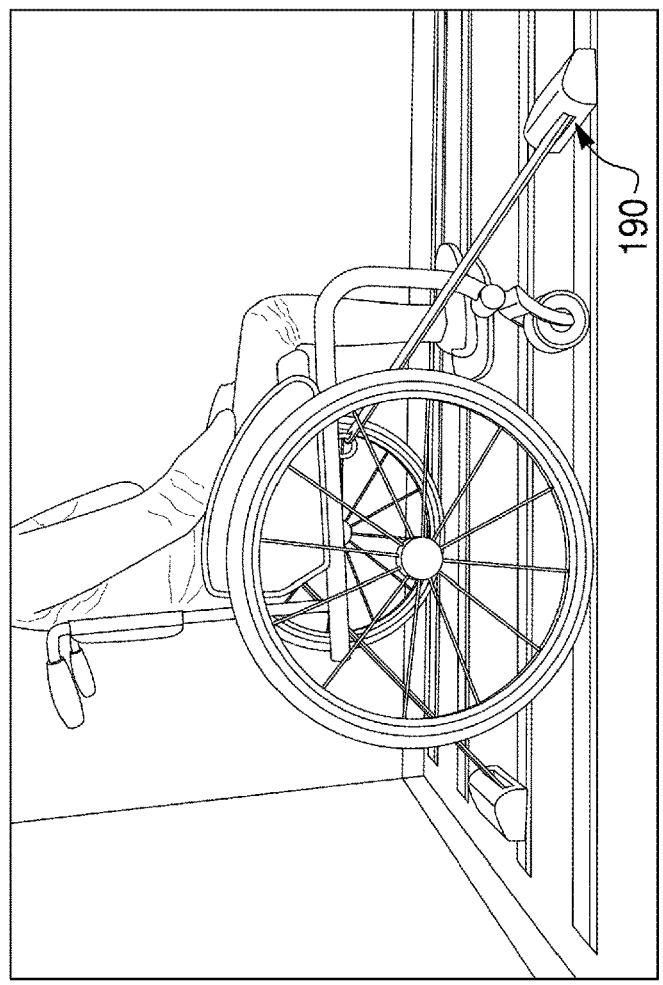
FIGS. 14A-14B depict utilization of a securement mechanism to secure a wheelchair to a vehicle, according to various aspects of the present disclosure.
Figure 14A:
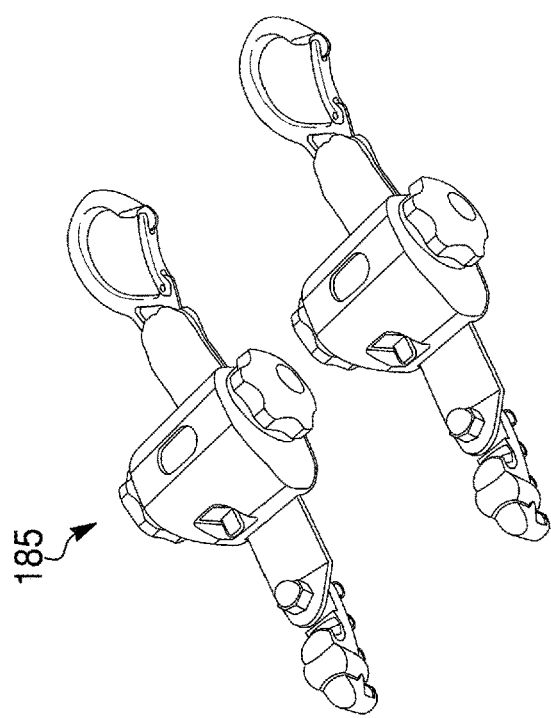

Referring now to FIG. 13, multimodal wheelchair 100 is illustrated that contains a plurality of securement mechanism attachment locations 180. One or more tie down securement mechanisms 185, such as those illustrated in FIG. 14A, may contain a first end and a second end. The first end of tie down securement mechanisms 185 may be attached to the securement mechanism attachment locations 180 of the multimodal wheelchair 100 and a second end may be attached to a portion of track 190 that is integrated into a vehicle floor, as illustrated in FIG. 14B. The securement mechanism described in FIGS. 13 and 14 may be utilized in addition to or in the absence of the securement mechanism described in FIGS. 11 and 12.

Figure 15B:
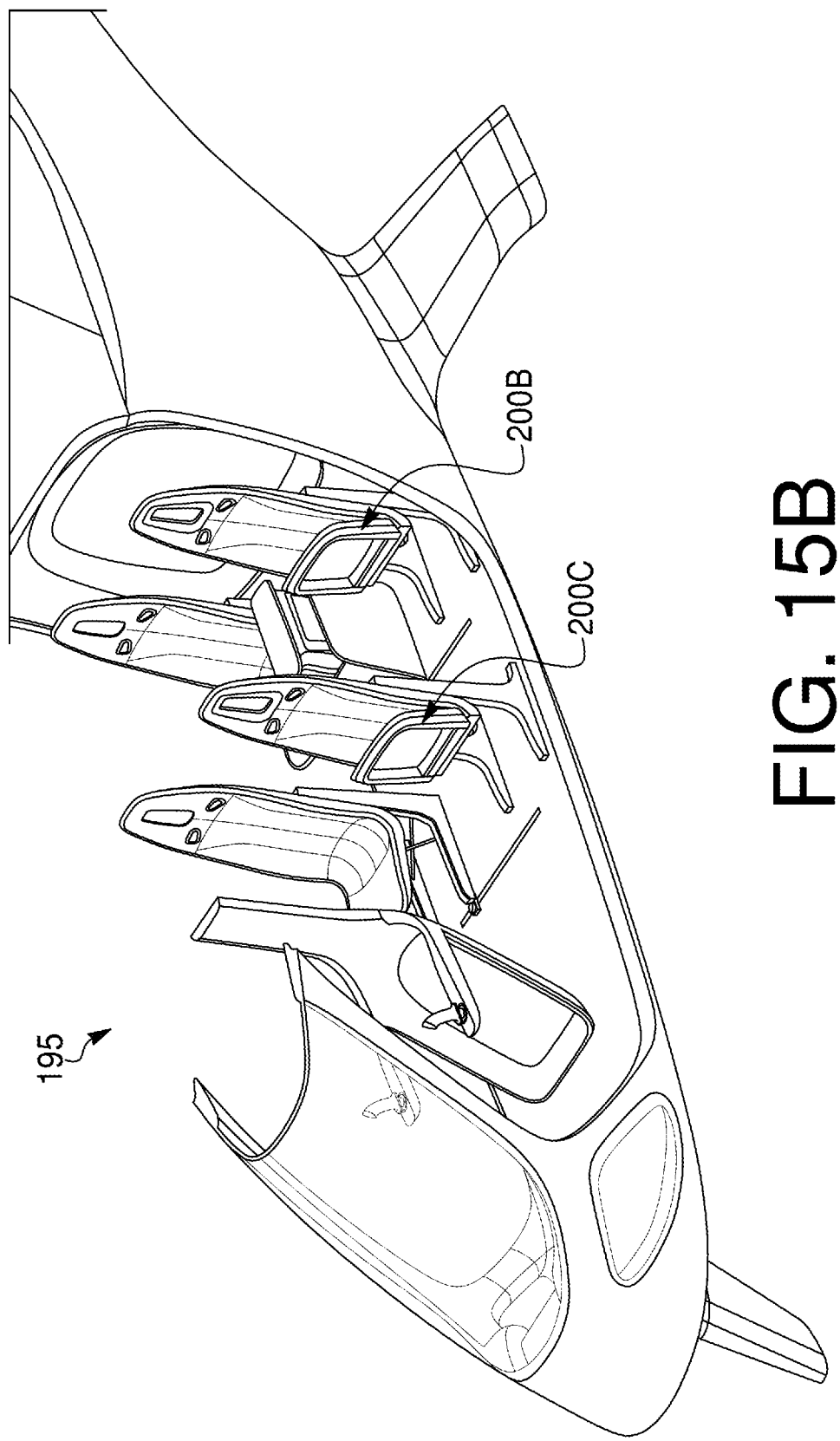
Figure 15C:
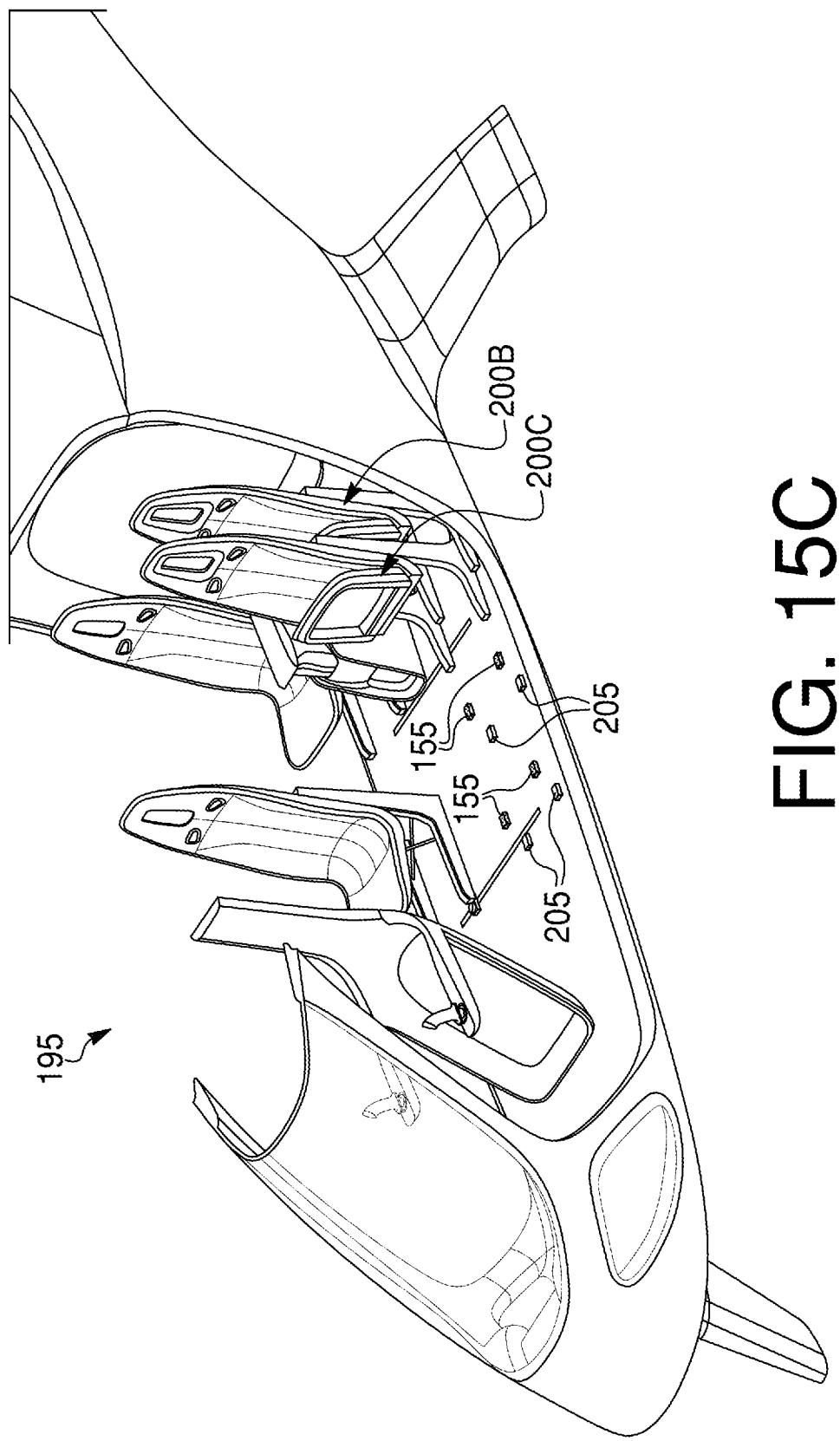
Figure 15D:
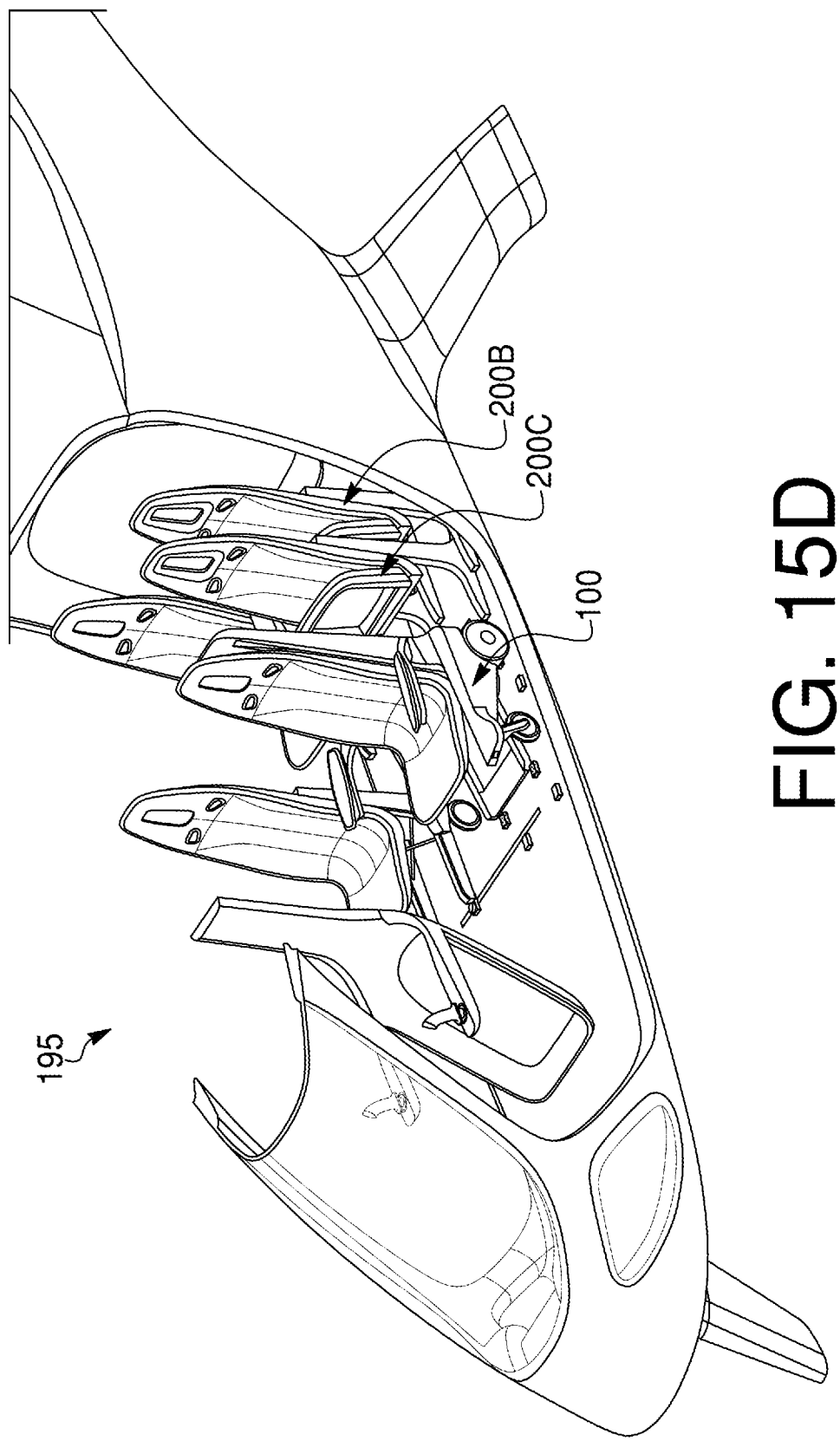
Figure 16A:
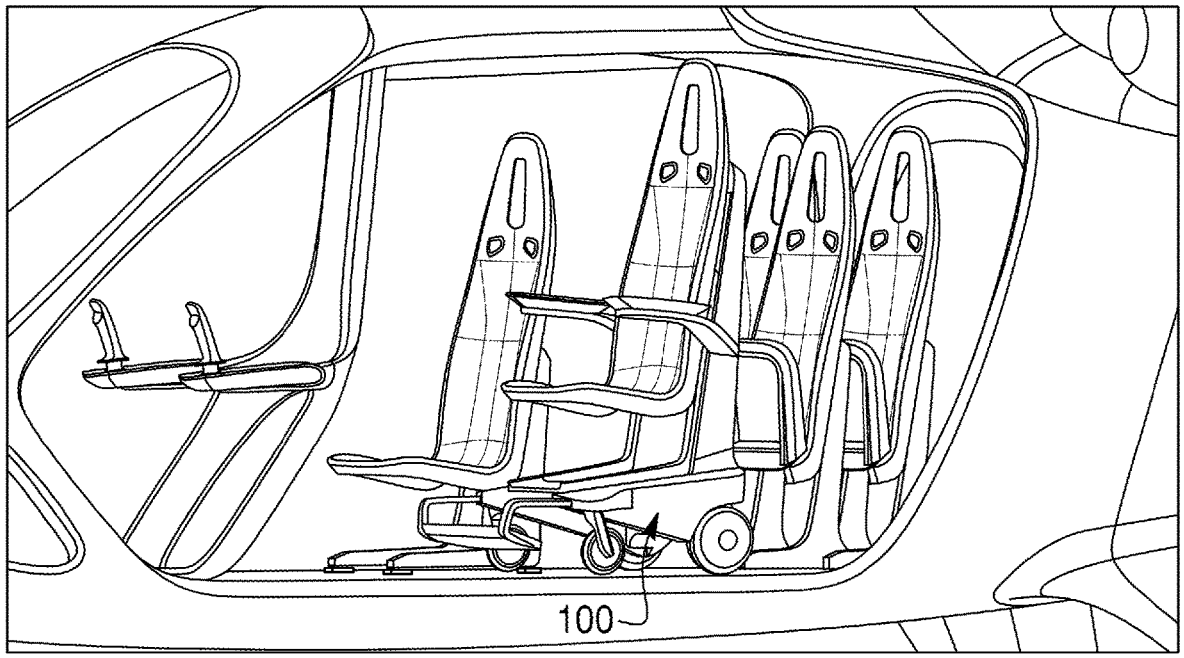
FIGS. 16A-16B depict various height configurations of the wheelchair seat during a docking process, according to various aspects of the present disclosure.
Figure 16B:
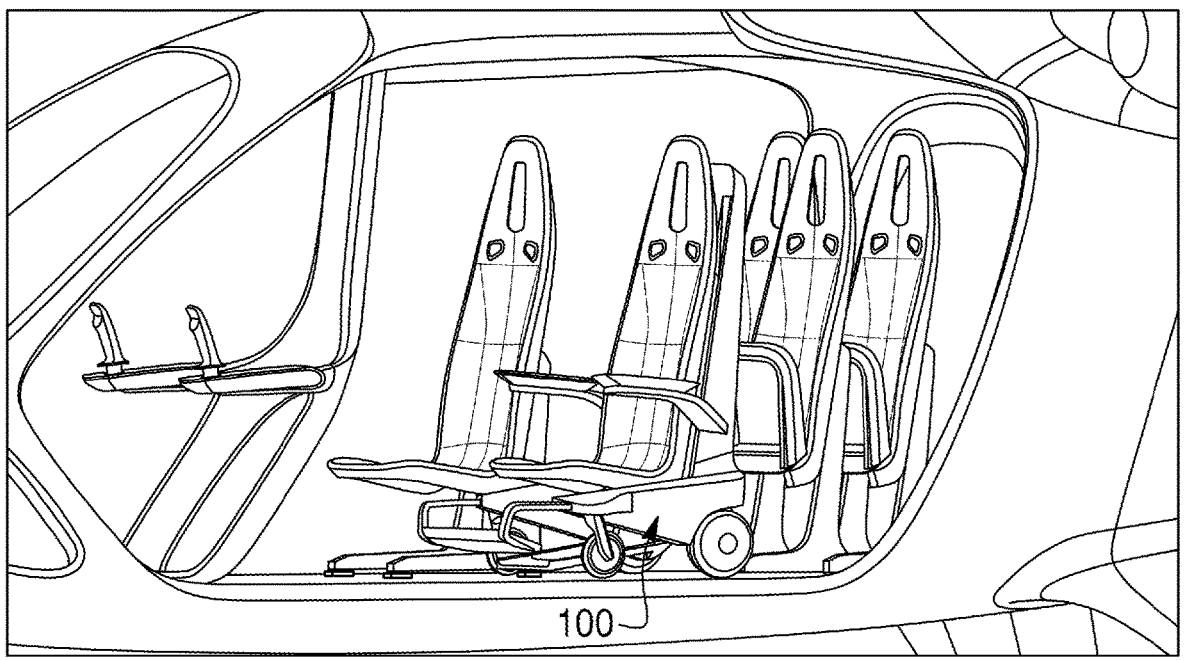
Figure 17:
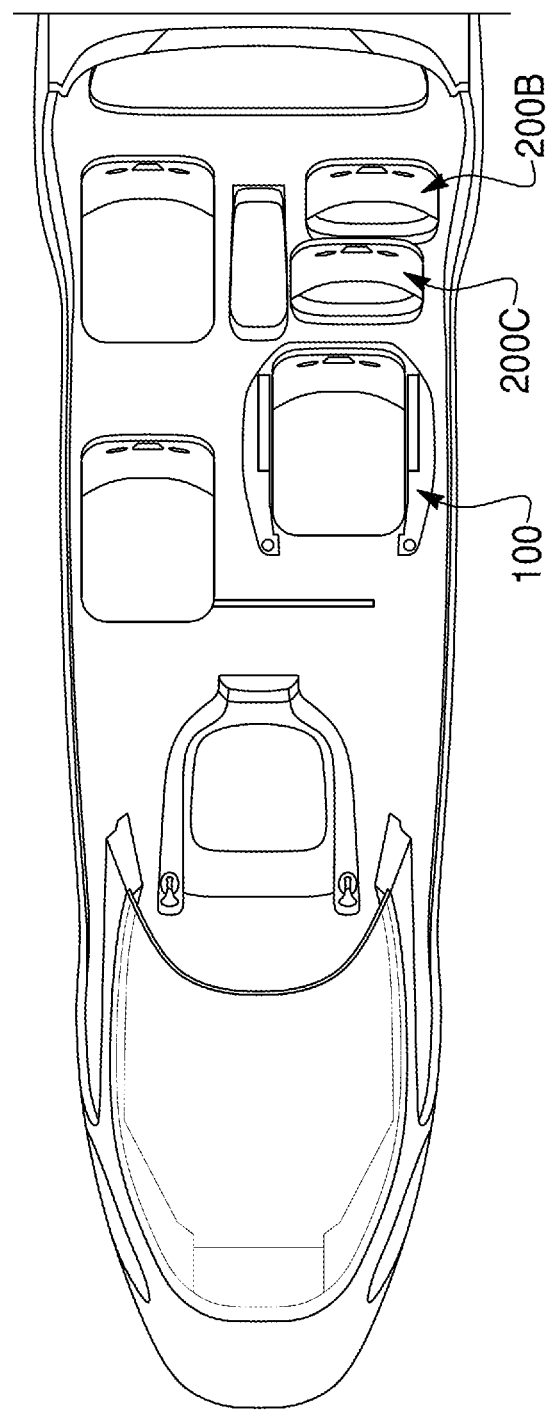
FIG. 17 depicts a top view of the multimodal wheelchair mounted to a vehicle, according to various aspects of the present disclosure.

Referring now to FIGS. 15A and 15D, a wheelchair docking process for securing a multimodal wheelchair within a passenger cabin of an aircraft is illustrated. FIG. 15A illustrates cabin 195 of a small aircraft, such as an EVTOL vehicle. In normal operation, cabin 195 may contain four passenger seats 200 (A-D). In an embodiment, one or more of these seats may be adjusted and moved to accommodate an individual using a multimodal wheelchair. For instance, FIGS. 15B and 15C illustrate that the two seats 200B, C may be folded up and moved to a rear portion of cabin 195. In this regard, seat 200C may be removed from its original position (represented by securement holes 205) and moved back toward another set of securement holes (not illustrated) near seat 200B. Thereafter, multimodal wheelchair 100 may align with locking mechanisms 155 and commence docking, as illustrated in FIG. 15D and as previously described above. FIGS. 16A and 16B provide additional views of multimodal wheelchair 100 during the docking process. More particularly, FIG. 16A illustrates multimodal wheelchair 100 in a "ride height" configuration in which it has aligned with locking mechanisms 155. FIG. 16B illustrates a transition of seat portion 105 of multimodal wheelchair 100 from the ride height configuration to a lock height configuration, in which securement mechanism 160 engages locking mechanisms 155, thereby securing multimodal wheelchair 100 in place. FIG. 17 illustrates a top-level view of a docked multimodal wheelchair 100 in an aircraft cabin subsequent to the docking processes described in FIGS. 15 and 16.

The many features and advantages of the present disclosure are apparent from the detailed specification, and thus, it is intended by the appended claims to cover all such features and advantages of the present disclosure that fall within the true spirit and scope of the disclosure. Further, since numerous modifications and variations will readily occur to those skilled in the art, it is not desired to limit the present disclosure to the exact construction and operation illustrated and described, and accordingly, all suitable modifications and equivalents may be resorted to, falling within the scope of the present disclosure.

Moreover, those skilled in the art will appreciate that the conception upon which this disclosure is based may readily be used as a basis for designing other structures, methods, and systems for carrying out the several purposes of the present disclosure. Accordingly, the claims are not to be considered as limited by the foregoing description.

What is claimed is:

1. A multimodal wheelchair, comprising:
   a first section, including:
      a processing system contained within a housing of the first section;
      a movement controller component positioned on a portion of the first section that is connected to the processing system;
      a plurality of wheels that are controllable by the movement controller; and
      a set of tracks recessed within a first side of the first section; and
   a second section, including:
      a seat portion located on a first side of the second section, the seat portion having an integrated harness; and
      a connection component, coupled to a second side of the second section, that attaches the second section to the first section via coupling with the set of tracks of the first section.

2. The multimodal wheelchair of claim 1, wherein the movement controller component comprises: a joystick controller, a speed adjustment knob, and a digital display.

3. The multimodal wheelchair of claim 1, wherein a height of the second section is adjustable with respect to the first section via user interaction with the movement controller portion.

4. The multimodal wheelchair of claim 1, wherein the seat portion is configured to vertically move relative to the connection component in response to a crash event.

5. The multimodal wheelchair of claim 1, wherein the first section further includes a securement mechanism configured to deploy from within the housing of the first section through a deployment port.

6. The multimodal wheelchair of claim 1, wherein the first section further comprises a footrest that is configured to dynamically expand or retract based on vertical movement of the second section with respect to the first section.

7. The multimodal wheelchair of claim 1, further comprising at least one armrest integrated with the first section.

8. The multimodal wheelchair of claim 7, wherein the movement controller is positioned on the at least one armrest.

9. The multimodal wheelchair of claim 1, further comprising a sensor system, operably coupled to the processing system, containing at least one sensor, wherein the sensor system is configured to enable autonomous docking of the multimodal wheelchair with a locking mechanism of a vehicle.

10. The multimodal wheelchair of claim 9, wherein the at least one sensor comprises at least one of: a camera sensor, a proximity sensor, and an infrared sensor.

11. A power chair base of an electronic wheelchair, comprising:
   a first section including a pair of recessed tracks configured to secure a seat section of the electronic wheelchair;
   a second section, connected to a distal end of the first section, including a plurality of wheels;
   a processor contained within a housing of the power chair base; and
   a movement controller positioned on a surface of the first section.

12. The power chair base of claim 11, further comprising a sensor system containing at least one sensor that is operably coupled to the processor.

13. The power chair base of claim 11, wherein manipulation of the movement controller is configured to cause the processor to adjust one or more of: a speed of the power chair base, a movement direction of the power chair base, and a height of the seat section.

14. The power chair base of claim 11, further comprising a deployable securement mechanism situated within the housing.

15. A method of autonomously docking an electronic wheelchair to a vehicle, the method comprising:
   receiving, at a system of the electronic wheelchair, sensor data;
   identifying, from the sensor data and using a processor associated with the system, an indication of a predetermined docking location within the vehicle;
   aligning, via instructions provided by the processor to a controller of the electronic wheelchair, the electronic wheelchair with the predetermined docking location; and
   deploying, subsequent to the aligning, a securement mechanism of the electronic wheelchair to attach with a locking mechanism present at the predetermined docking location.

16. The method of claim 15, wherein the indication of the predetermined docking location corresponds to identification of at least one of: a predefined object or a predefined marking.

17. The method of claim 15, wherein the securement mechanism is a bolt configured to deploy through a deployment hole from within the electronic wheelchair.

18. The method of claim 15, wherein the securement mechanism is a height-adjustable portion of the electronic wheelchair that is shaped to interact with connection points of the locking mechanism.

19. The method of claim 15, further comprising transmitting a docking notification to a designated device.

20. The method of claim 19, wherein the designated device is at least one of: a personal computing device associated with a user, a movement controller of the electronic wheelchair, and another device associated with a pilot of the vehicle.

\* \* \* \* \*